(12) United States Patent
Hoh (10) Patent No.: US 7,138,610 B2
(45) Date of Patent: Nov. 21, 2006

(54) ELECTRIC COOKER

(75) Inventor: Jung-Eui Hoh, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/788,311

(22) Filed: Mar. 1, 2004

(65) Prior Publication Data

US 2005/0067400 A1    Mar. 31, 2005

(30) Foreign Application Priority Data

Sep. 30, 2003    (KR) ...................... 10-2003-0068047

(51) Int. Cl.
*H05B 3/68* (2006.01)
(52) U.S. Cl. ................... 219/465.1; 219/445.1
(58) Field of Classification Search ............. 219/443.1, 219/450.1, 451.1, 452.11, 452.12, 455.12, 219/460.1, 461.1, 465.1, 466.1, 124, 125; 99/378, 379
See application file for complete search history.

(56) References Cited

U.S. PATENT DOCUMENTS

| 3,737,624 | A | * | 6/1973 | Eilenberger | ................. 219/525 |
| 3,987,275 | A | * | 10/1976 | Hurko | ...................... 219/451.1 |
| 5,508,495 | A | * | 4/1996 | Yahav et al. | ............. 219/466.1 |
| 6,037,572 | A | * | 3/2000 | Coates et al. | ............ 219/451.1 |
| 6,486,447 | B1 | * | 11/2002 | Miyata | .................... 219/444.1 |

FOREIGN PATENT DOCUMENTS

JP    6-304074    4/1993

* cited by examiner

*Primary Examiner*—S. Paik
(74) *Attorney, Agent, or Firm*—Staas & Halsey LLP (57) ABSTRACT

An electric cooker having an enhanced heat insulating property to improve heat efficiency. The electric cooker includes a cabinet, a cooking plate disposed at a top portion of the cabinet, a heating member to heat the cooking plate, at least one heat insulating member disposed below the heating member to prevent heat generated by the heating member from being transmitted downward, and a reflecting member to reflect thermal infrared lights generated from the heating member towards the heat insulating member.

23 Claims, 6 Drawing Sheets

ELECTRIC COOKER

CROSS-REFERENCE TO RELATED APPLICATIONS

This application claims the benefit of Korean Patent Application No. 2003-68047, filed Sep. 30, 2003, in the Korean Intellectual Property Office, the disclosure of which is incorporated herein by reference.

BACKGROUND OF THE INVENTION

1. Field of the Invention

The present invention relates to an electric cooker, and more particularly, to an electric cooker designed to insulate against heat generated from a heating member.

2. Description of the Related Art

Generally, an electric cooker carries out cooking operations using a heat source produced by converting electricity into heat.

The conventional cooker is typically provided with a casing that includes a cooking plate at a top thereof, to allow cooking containers to be placed on the cooking plate. The electric cooker further includes a heater to serve as a heat source, and a control unit to drive the heater via electric signals, both of which are provided below the cooking plate. To prevent heat generated by the heater from affecting the control unit disposed below the casing, the heater is spaced apart from the control unit or heat insulating material, such as glass fiber, is provided between the heater and the control unit.

According to the conventional electric cooker, where the heater is spaced apart from the control unit by a predetermined distance, the resulting electric cooker product has an increased thickness, thereby, making production of a thin product complex. Furthermore, where a heat insulating material, such as glass fiber, is provided between the heater and the control unit, production of the electric cooker becomes more complicated and costly.

Japanese Patent Laid-open No. Hei6-304074 discusses an electric cooker provided with a heating sheet, on which a conductive resistive element is patterned, in place of the heater. According to this electric cooker, the heating sheet is spaced apart from an object disposed therebelow or a heat insulating member, such as ceramic fibers rather than the glass fiber, is closely attached to a lower surface of the heating sheet. Accordingly, productivity is improved and the product is thinner while production costs are lowered.

Because the heat insulating member of the conventional electric cooker is made of ceramic fibers having a high heat resistance, productivity and production costs of the electric cooker made of the ceramic fibers are superior to those of the electric cooker made of glass fibers. However, the electric cooker made of ceramic fibers has a relatively deteriorated heat insulating property, thus, causing heat efficiency to decrease.

Further, because the heating sheet of the conventional electric cooker includes a heat insulating member attached thereto, the heat insulating member and the heating sheet may burn out in cases where the heat insulating member and the heating sheet have thermal expansion coefficients different from each other.

SUMMARY OF THE INVENTION

Accordingly, it is an aspect of the present invention to provide an electric cooker having an enhanced heat insulating property to improve heat efficiency.

It is another aspect of the present invention to provide an electric cooker, which prevents damages caused due to a difference between thermal expansion coefficients of a heating member and a heat insulating member, to improve operational safety of the electric cooker.

Additional aspects and advantages of the invention will be set forth in part in the description which follows and, in part, will be obvious from the description, or may be learned by practice of the invention.

The above and/or other aspects are achieved by providing an electric cooker including a cabinet, a cooking plate disposed at a top portion of the cabinet, a heating member to heat the cooking plate, at least one heat insulating member disposed below the heating member to prevent heat generated by the heating member from being transmitted downward, and a reflecting member to reflect thermal infrared light generated from the heating member towards the heat insulating member.

According to an aspect of the present invention, the reflecting member may be provided on a part or all of an outer surface of the heat insulating member. Further, according to another aspect of the present invention, the reflecting member may be made of beryllium oxide (BeO) or aluminum oxide ($Al_2O_3$).

The heat insulating member and the reflecting member may be provided spaced apart from each other by a predetermined distance.

According to another aspect of the present invention, a plurality of heat insulating members are provided, and the heat insulating members may be spaced apart from the heating member and spaced apart from each other.

When the heat insulating member is in close contact with or closely attached to the heating member, the heat insulating member and the heating member may have equal heat expansion coefficient, or heat expansion coefficients within a preset range.

According to an aspect of the present invention, a surface area of the heat insulating member may be larger than that of the heating member.

Further, according to another aspect of the present invention, the heating member may be provided on a part or all of a lower surface of the cooking plate on which cooking containers are placed.

According to yet another aspect of the present invention, the heat insulating member may be slidably fitted in the cabinet.

The heat insulating member may be made of glass material or ceramic material having a high heat resistance.

BRIEF DESCRIPTION OF THE DRAWINGS

These and/or other aspects and advantages of the invention will become apparent, and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
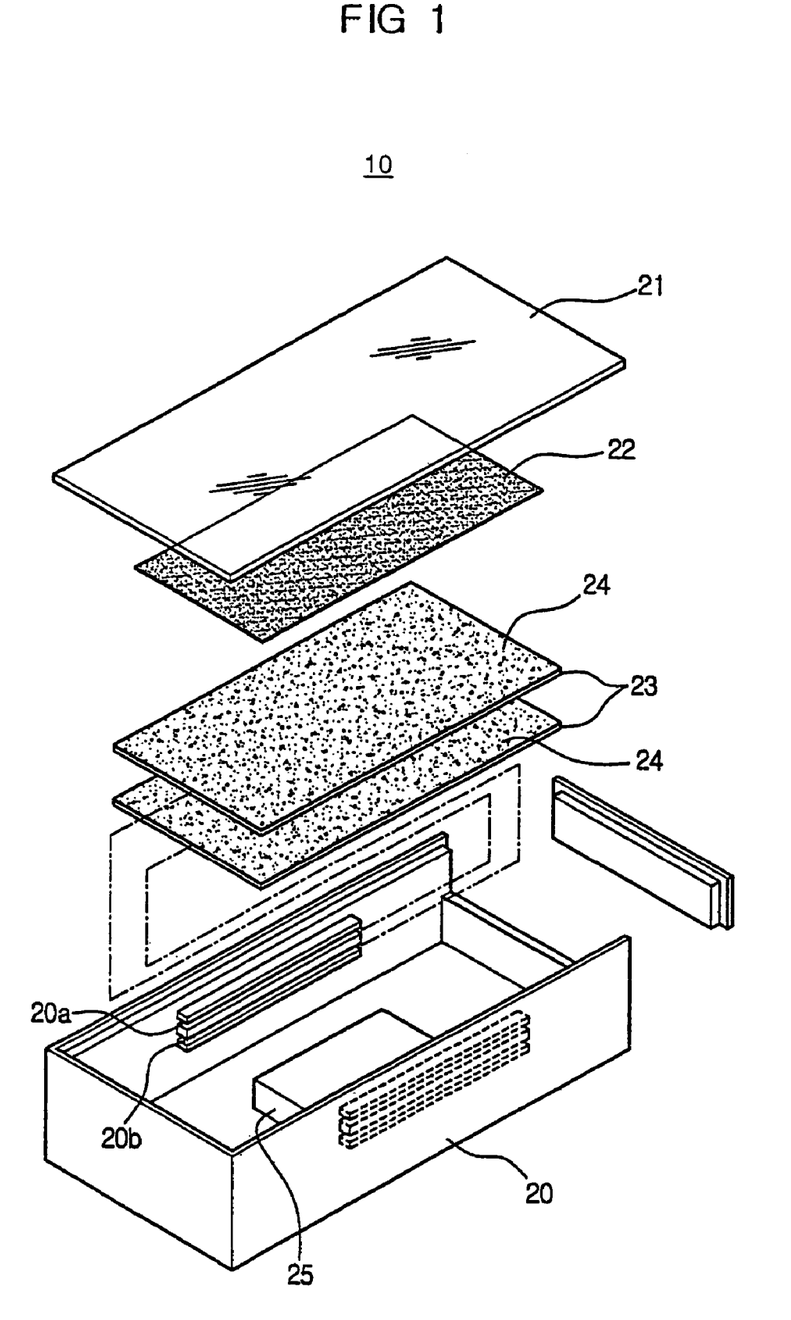
FIG. 1 is an exploded perspective view of an electric cooker according to an aspect of the present invention.
Figure 2:
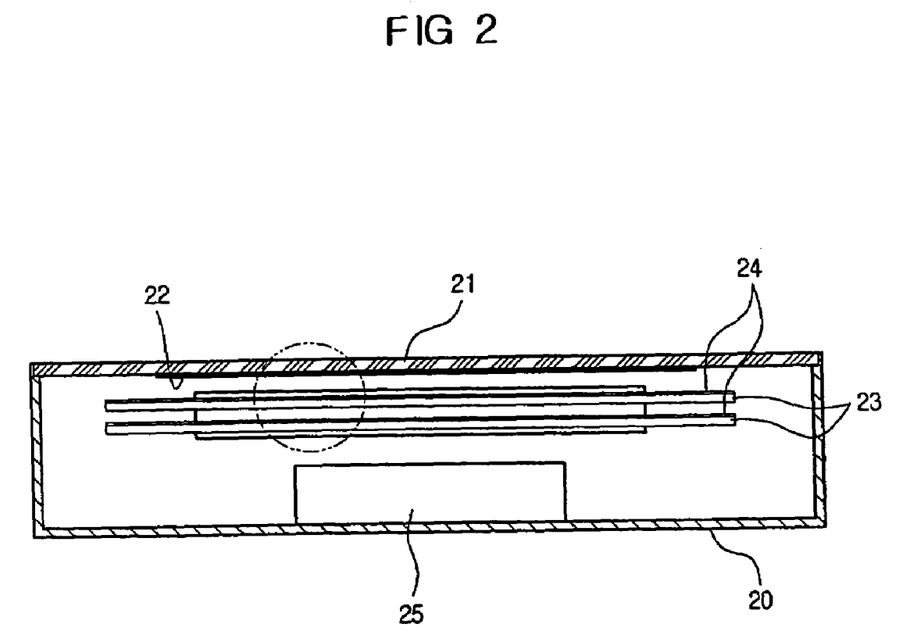
FIG. 2 is a cross-sectional view of the electric cooker of FIG. 1.
Figure 3:
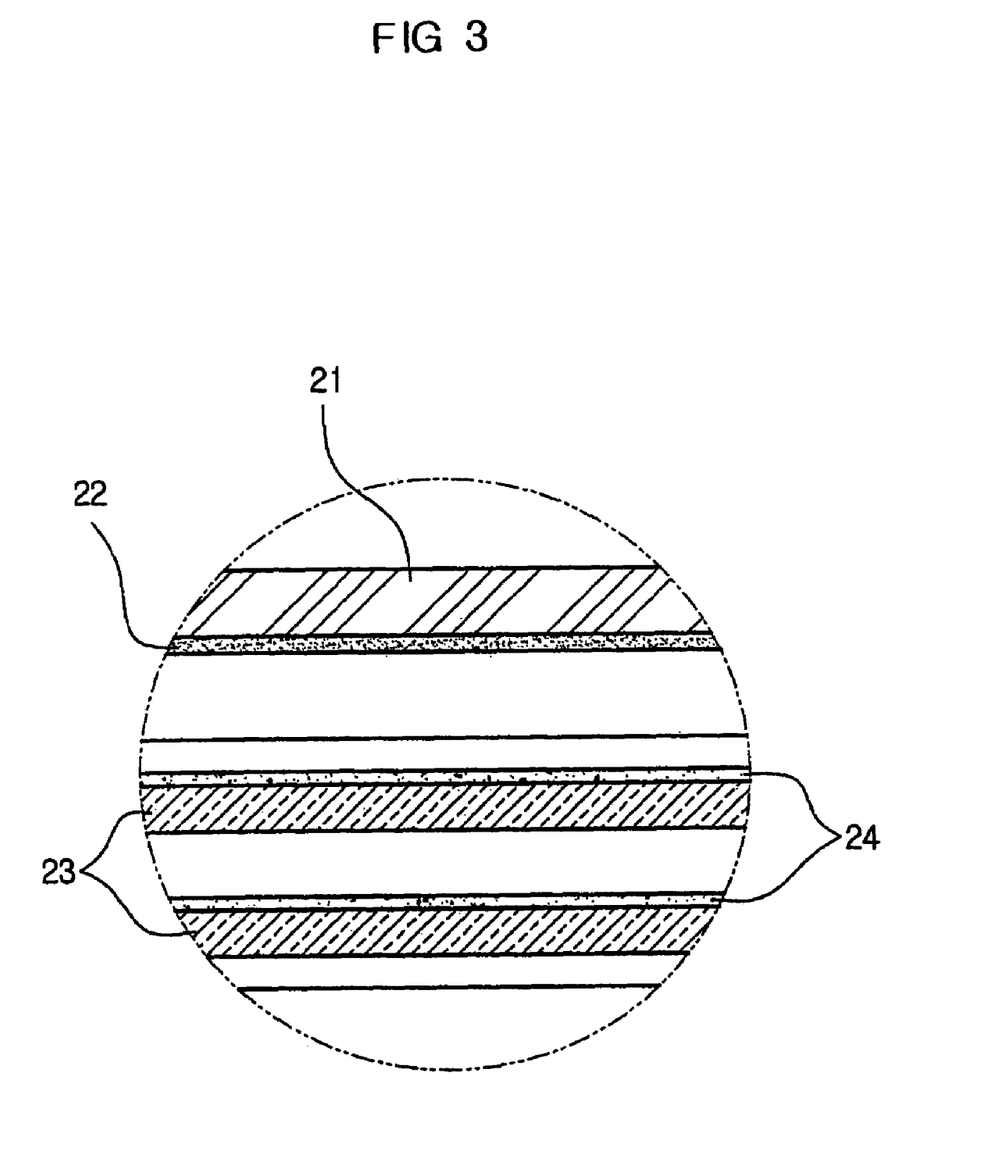
FIG. 3 is a partially enlarged view of the electric cooker of FIG. 1.

As shown in FIGS. 1 and 2, the electric cooker 10 according to an aspect of the present invention includes a cabinet 20. A cooking plate 21 is provided to a top portion of the cabinet 20 to allow cooking containers to be placed on the cooking plate 21. For example, the cooking plate 21 may be made of ceramic material having a high heat resistance or may be made of glass material having a high heat resistance, rather than the ceramic material.

A heating member 22, to serve as a heat source, is provided below the cooking plate 21. The heating member 22 is comprised of a heating sheet, which generates heat in response to electric signals. The heating sheet 22 is provided on a part or all of a lower surface of the cooking plate 21. The heating sheet 22 is predominantly made of tin or antimony, and is formed by coating tin or antimony on the lower surface of the cooking plate 21 under high temperatures ranging from 600° C. to 800° C.

Figure 4:
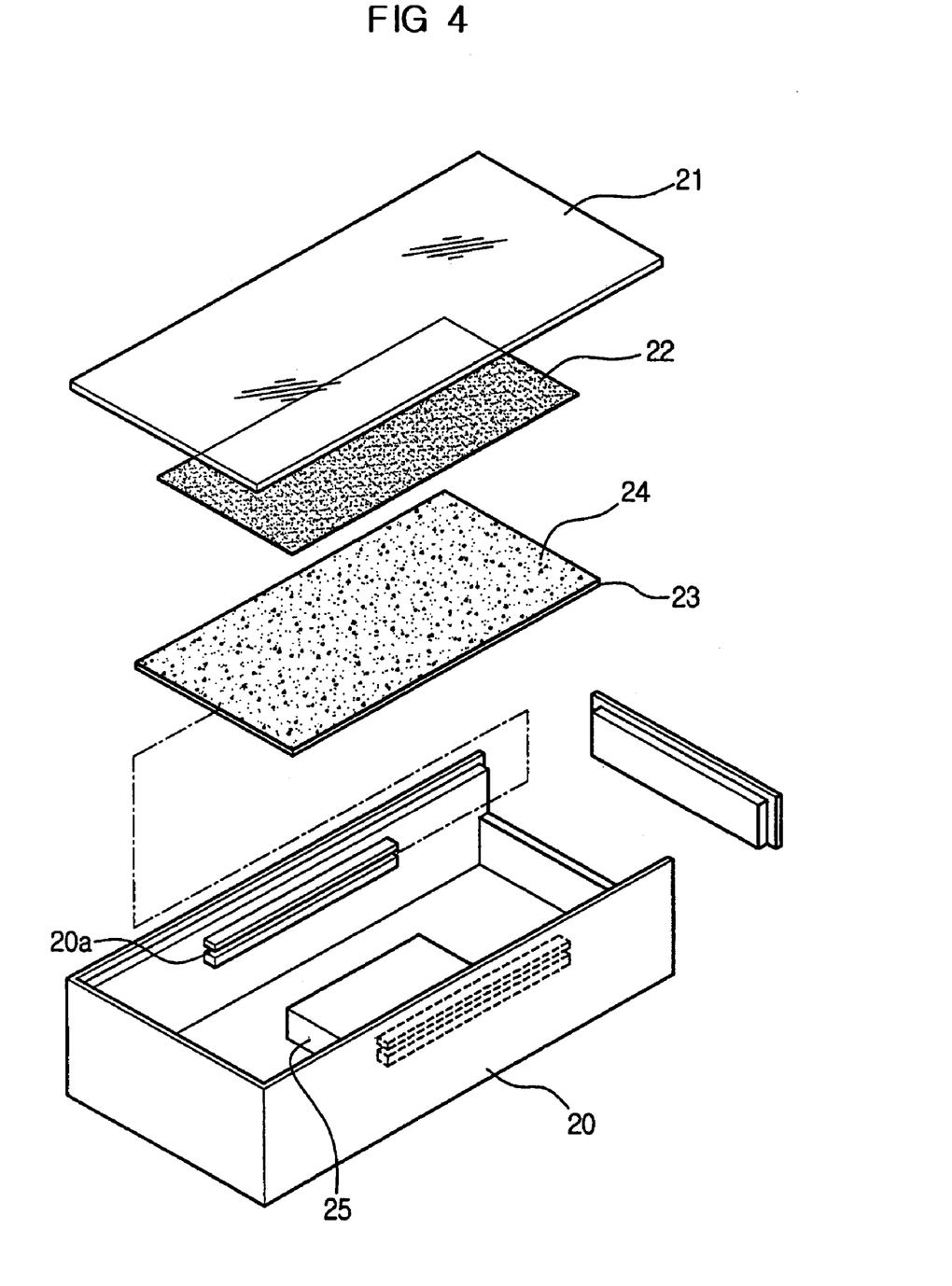
FIG. 4 is an exploded perspective view of an electric cooker according to another aspect of the present invention.
Figure 5:
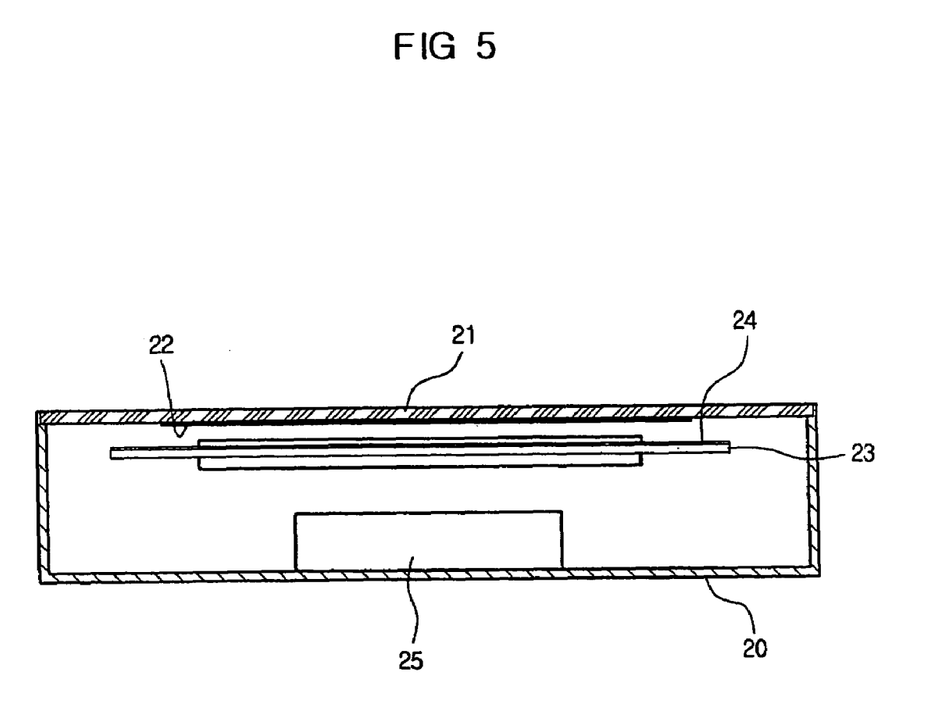
FIG. 5 is a cross-sectional view of the electric cooker of FIG. 4.

According to an aspect of the present invention, at least one heat insulating member 23 is provided below the heating member 22 to prevent heat generated by the heating member 22 from being transferred downward. The heat insulating member 23 has a surface area larger than that of the heating member 22. Further, a single heat insulating member 23 may be provided as shown in FIGS. 4 and 5.

According to another aspect of the present invention, the heat insulating member 23 is made of glass or ceramic having high heat resistance. The reflecting members 24, which have excellent reflectivity of thermal infrared lights, are provided on a part or all of an outer surface of the heat insulating member 22. The reflecting members 24 are made of material having an excellent reflectivity, such as beryllium oxide (BeO) or aluminum oxide ($Al_2O_3$). Consequently, thermal infrared lights generated by the heating member 22 are reflected towards the heating member 22 by the reflecting members 24, thus, improving heat insulating property and thereby heat efficiency.

The at least one heat insulating member 23 is spaced apart from the heating member 22 by a predetermined distance to block transmission of conductive heat generated from the heating member 22.

According to an aspect of the present invention where a plurality of heat insulating members 23 are provided in the electric cooker, the plurality of heat insulating members 23 are spaced apart from one another to block conduction of heat. Consequently, heat efficiency of products is improved by an improved heat insulating property.

Figure 6:
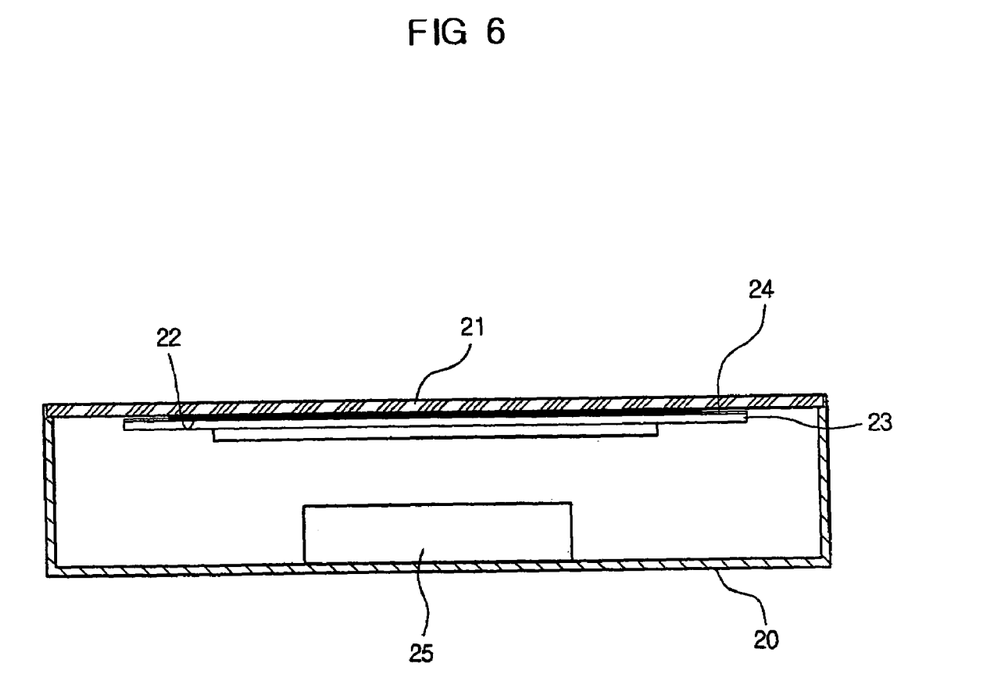
FIG. 6 is a cross-sectional view of the electric cooker of FIG. 5 wherein a reflecting member to reflect thermal infrared light and heat insulating material are attached to a heating member.

As shown in FIG. 6, where the heat insulating member 23 is in close contact with or is attached to the heating member 22, the heat insulating member 23 and the heating member 22 may burn out due to a difference of heat expansion coefficients therebetween. To prevent this damage, the heat insulating member 23 and the heating member 22 are made of materials having the same heat expansion coefficient or heat expansion coefficients within a preset range. Alternatively, the heating member 22 and the heat insulating member 23 may be configured into a structure capable of absorbing heat expansions thereof, meaning, the heating member 22 and the heat insulating member 23 may be positioned to have a gap therebetween, thereby, improving an operational safety of the products.

The heat insulating member 23 is installed in the cabinet 20 containing the control unit 25. To this end, the cabinet 20 includes guide grooves 20a and 20b at both inner sides thereof, so that the heat insulating member 23 is slidably inserted in the guide grooves 20a and 20b and held therein.

As is apparent from the above description, an aspect of the present invention provides an electric cooker having an enhanced heat insulating property to improve heat efficiency.

Furthermore, the electric cooker according to another aspect of the present invention prevents a heating member and a heat insulating member from being damaged due to the difference between thermal expansion coefficients of the heating member and the heat insulating member, thus, improving an operational safety of the electric cooker.

In addition, the electric cooker according to another aspect of the present invention has a simplified structure compared to a conventional electric cooker to improve its assembling property.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric cooker, comprising:
   a cabinet;
   a cooking plate disposed at a top portion of the cabinet;
   a heating member to heat the cooking plate;
   at least one slidably insertable heat insulating member disposed below the heating member to prevent heat generated by the heating member from being transmitted downward; and
   a reflecting member provided on at least a portion of an outer surface of the at least one slidably insertable heat insulating member, said portion facing the heating member, to reflect a thermal infrared light generated from the heating member towards the at least one heat insulating member,
   wherein the cabinet comprises guide grooves provided at both inner sides of the cabinet to allow the at least one heat slidably insertable insulating member to be slidably inserted therein.

2. The electric cooker as set forth in claim 1, wherein the reflecting member is provided on a part or all of an outer surface of the at least one heat insulating member.

3. The electric cooker as set forth in claim 2, wherein the reflecting member is made of beryllium oxide (BeO) or aluminum oxide ($Al_2O_3$).

4. The electric cooker as set forth in claim 2, wherein the at least one heat insulating member and the reflecting member are spaced apart from each other by a predetermined distance.

5. The electric cooker as set forth in claim 2, wherein the at least one heat insulating member comprises a plurality of heat insulating members, and the heat insulating members are spaced apart from the heating member and spaced apart from each other.

6. The electric cooker as set forth in claim 5, wherein the additional heat insulating members that are spaced apart from each other block conduction of heat.

7. The electric cooker as set forth in claim 2, wherein when the at least one heat insulating member is in close contact with or closely attached to the heating member, the at least one heat insulating member and the heating member have heat expansion coefficients within a preset range.

8. The electric cooker as set forth in claim 1, wherein a surface area of the at least one heat insulating member is larger than that of the heating member.

9. The electric cooker as set forth in claim 1, wherein the heating member is provided on a part or all of a lower surface of the cooking plate on which cooking containers are placed.

10. The electric cooker as set forth in claim 1, wherein the at least one heat insulating member is slidably fitted in the cabinet.

11. The electric cooker as set forth in claim 10, wherein the heating member is formed of tin or antimony coated on a lower surface of the cooking plate.

12. The electric cooker as set forth in claim 1, wherein the at least one heat insulating member is made of glass material or ceramic material having a high heat resistance.

13. The electric cooker as set forth in claim 1, wherein the at least one heat insulating member is provided spaced apart from the heating member by a predetermined distance to block transmission of conductive heat generated from the heating member.

14. The electric cooker as set forth in claim 1, wherein the reflecting member comprises: a plurality of reflecting members.

15. The electric cooker as set forth in claim 1, wherein the at least one heat insulating member and the heating member are configured to accommodate differing heat expansion coefficients of each other.

16. An electric cooker having a cabinet, comprising:
a cooking plate disposed at a top portion of the cabinet;
a heating member to heat the cooking plate;
a plurality of slidably insertable heat insulating members disposed below the heating member to prevent heat generated by the heating member from being transmitted; and
a plurality of reflecting members provided on at least a portion of an outer surface of each of the plurality of slidably insertable heat insulating members, said portion of the outer surface facing the heating member, to reflect a thermal infrared light generated from the heating member towards the plurality of heat insulating members,
where the cabinet comprises guide grooves provided at both inner sides of the cabinet to allow the plurality of heat insulating members to be slidably inserted therein.

17. The electric cooker as set forth in claim 16, wherein the plurality of heat insulating members are provided spaced apart from each other, and
the plurality of reflecting members are provided in between the spaced apart plurality of heat insulating members.

18. The electric cooker as set forth in claim 16, wherein the plurality of heat insulating members and the heating member are configured to accommodate differing heat expansion coefficients of each other.

19. The electric cooker as set forth in claim 16, wherein the reflecting members are made of beryllium oxide (BeO), aluminum oxide ($Al_2O_3$).

20. An electric cooker having a cabinet, comprising:
a cooking plate disposed at a top portion of the cabinet;
a heating member to heat the cooking plate;
a plurality of heat insulating members disposed below the heating member to prevent heat generated by the heating member from being transmitted; and
a plurality of reflecting members to reflect a thermal infrared light generated from the heating member towards the plurality of heat insulating members, where the cabinet comprises guide grooves provided at both inner sides of the cabinet to allow the plurality of heat insulating members to be slidably inserted therein.

21. An electric cooker having a cooking plate disposed at a top portion of a cabinet, comprising:
at least one slidably insertable reflecting member to reflect a thermal infrared light generated from a heating member towards a heat insulating member, where the at least one slidably insertable reflecting member is slidably inserted between the heating member and the heat insulating member and in contact with the cabinet, thereby covering at least a portion of an outer surface of the heat insulating member, said portion facing the heating member, such that heat generated from the heating member is insulated,
where the cabinet comprises guide grooves provided at both inner sides of the cabinet to allow the heat insulating member and the at least one slidably insertable reflecting member to be slidably inserted therein.

22. An electric cooker having a cooking plate disposed at a top portion of a cabinet, comprising:
a heating member to heat the cooking plate; and
a heat insulating member provided below the heating member to prevent heat generated by the heating member from being transferred downward;
wherein the heating member and heat insulating member have a same heat expansion coefficient,
where the cabinet comprises guide grooves provided at both inner sides of the cabinet to allow the heat insulating member to be slidably inserted therein.

23. An electric cooker having a cooking plate disposed at a top portion of a cabinet, comprising:
a heating member to heat the cooking plate; and
a heat insulating member provided below the heating member to prevent heat generated by the heating member from being transferred downward;
wherein a difference of heat expansion coefficients of the heating member and heat insulating member is within a predetermined range to prevent damage due to dissimilar heat expansions,
where the cabinet comprises guide grooves provided at both inner sides of the cabinet to allow the heat insulating member to be slidably inserted therein.

* * * * *

UNITED STATES PATENT AND TRADEMARK OFFICE
CERTIFICATE OF CORRECTION

| | | |
|---|---|---|
| PATENT NO. | : 7,138,610 B2 | Page 1 of 1 |
| APPLICATION NO. | : 10/788311 | |
| DATED | : November 21, 2006 | |
| INVENTOR(S) | : Jung-Eui Hoh | |

It is certified that error appears in the above-identified patent and that said Letters Patent is hereby corrected as shown below:

Column 6, Line 57, change "expansions," to --expansion,--.

Signed and Sealed this

Thirteenth Day of March, 2007

JON W. DUDAS
*Director of the United States Patent and Trademark Office*